United States Patent
Hsu

(10) Patent No.: US 6,970,596 B2
(45) Date of Patent: Nov. 29, 2005

(54) METHOD FOR COMPRESSING AN IMAGE BY CLASSIFYING COLORS

(75) Inventor: Chiun-Wen Hsu, Chia-I (TW)

(73) Assignee: Aiptek International Inc., Hsin-Chu (TW)

(*) Notice: Subject to any disclaimer, the term of this patent is extended or adjusted under 35 U.S.C. 154(b) by 588 days.

(21) Appl. No.: 10/103,768

(22) Filed: Mar. 25, 2002

(65) Prior Publication Data

US 2003/0179925 A1   Sep. 25, 2003

(51) Int. Cl.$^7$ .............................. G06K 9/00; G06K 9/36
(52) U.S. Cl. ..................... 382/166; 382/164; 382/173; 382/232; 345/604
(58) Field of Search ............................ 382/162–167, 382/173, 224, 232; 345/604

(56) References Cited

U.S. PATENT DOCUMENTS

| | | | | |
|---|---|---|---|---|
| 5,101,448 A | * | 3/1992 | Kawachiya et al. | 382/287 |
| 6,185,328 B1 | * | 2/2001 | Shiau | 382/173 |
| 6,195,081 B1 | * | 2/2001 | Stedman | 345/604 |

* cited by examiner

Primary Examiner—Bhavesh M. Mehta
Assistant Examiner—Yubin Hung
(74) Attorney, Agent, or Firm—Rosenberg, Klein & Lee

(57) ABSTRACT

A method for compressing image data by classifying colors. Initially, image data is transformed from an RGB coordinate to a Lab coordinate. Subsequently, each pixel of the image from the beginning to an end of the first row data is processed in turn. After finishing the processing of the first row data, the next row data is processed in turn to completely process the image.

9 Claims, 3 Drawing Sheets

|   |   |   |   |   |   |
|---|---|---|---|---|---|
| R | 1 | 2 | 3 | 4 | 5 | 6 |
| G | 1 | 2 | 3 | 4 | 5 | 6 |
| B | 1 | 2 | 3 | 4 | 5 | 6 |

$(2n-1)^{th}$ Line

|   |   |   |   |   |   |
|---|---|---|---|---|---|
| R | 1 | 2 | 3 | 4 | 5 | 6 |
| G | 1 | 2 | 3 | 4 | 5 | 6 |
| B | 1 | 2 | 3 | 4 | 5 | 6 |

$2n^{th}$ Line

FIG. 1A(PRIOR ART)

| R(2n-1, k)  | R(2n-1, k+1)  | R(2n-1, k+2)  |
| G(2n-1, k)  | G(2n-1, k+1)  | G(2n-1, k+2)  |
| B(2n-1, k)  | B(2n-1, k+1)  | B(2n-1, k+2)  |
|---|---|---|
| R(2n, k)    | R(2n, k+1)    | R(2n, k+2)    |
| G(2n, k)    | G(2n, k+1)    | G(2n, k+2)    |
| B(2n, k)    | B(2n, k+1)    | B(2n, k+2)    |
| R(2n+1, k)  | R(2n+1, k+1)  | R(2n+1, k+2)  |
| G(2n+1, k)  | G(2n+1, k+1)  | G(2n+1, k+2)  |
| B(2n+1, k)  | B(2n+1, k+1)  | B(2n+1, k+2)  |

FIG. 1B(PRIOR ART)

METHOD FOR COMPRESSING AN IMAGE BY CLASSIFYING COLORS

BACKGROUND OF THE INVENTION

1. Field of the Invention

The present invention relates to a method for compressing an image, more particularly, to a method for compressing an image by classifying colors to decrease amounts of data and increase amounts of the image data saved in the memory.

2. Description of the Prior Art

For present information users, especially to the personal computer users, a mode of the computer information has been changed from an unexciting word mode to a multi-media mode. The multi-media mode means that the information comprises words, images, and sounds. In order to show the multi-media mode in the face of viewers, various multi-media devices, which can collect the images and sounds, are developed. Because the multi-media information comprises more matters, memories, which are used to deal with the multi-media information, are greater than memories, which are used to deal with the unexciting word information to show the multi-media information more smoothly.

For an input image device, scanners and digital cameras are the common devices at the present day. The digital camera uses digital information to save the image, which is got from shooting a scene on a location. It uses a floppy disk card or a personal computer memory card international association (PCMCIA) card to save a static image. In order to decrease the memory of saving multi-media information, the images, which is got from shooting a scene on a location by using a digital camera, are saved by using compression files. The file format of a joint photographic experts group (JPEG) mode is common used in the static image compression files.

A photo, which is taken by using a digital camera, can be transmitted to the computer to proceed an image process by using a RS-232 communication port or a printer port. The photo also can be printed by using a printer and can not be showed by using the traditional developing and printing method. Getting the photo further has no problems in fixing a negative. Therefore, the digital camera is very suitable for reporters, who usually compete with time, because the digital camera can transmit the photo to become a file directly and then the file can be transmitted to newspaper office by using an electronic mail. At present, a dpi of the digital camera has several differences to a dpi of a traditional camera, which uses a negative. Especially when a light source of a place is not enough, the dpi of the digital camera is not being quite as good as the traditional camera. But there is a liquid crystal display (LCD) usually fixed in the digital, the photo image data can be previewed and deleted by using the LCD. This is a characteristic of the digital camera and is different from the traditional camera.

The other name of the digital is "digital still camera; DSC" to be differentiated from a digital dynamic camera. At present, most digital cameras use a charge-coupled device (CCD) or a complementary metal-oxide semiconductor (CMOS) to get a photo image data.

Referring to FIGS. 1A and 1B, this shows a diagram in an image, which is got from the traditional technology and is before transmitted. FIG. 1A shows how to choose R (red), G (green), and B (blue) at a beginning area of a digital image data. In FIG. 1A, each block expresses one color information of a pixel in the digital image area. The number, which is in the block, expresses the location of the pixel in the digital image area. In the specification of the present invention, the signal P(x, y) expresses the image information-pixel value, wherein the signal x expresses a serial number of lines and the signal y expresses a serial number of the pixel on a line. For example, the signal P(2n−1, 1) expresses a pixel value, which is the first pixel of the 2n−1 line, wherein the signal n is a natural number.

FIG. 1B shows a condition of R, G, and B, which corresponds to each pixel. In FIG. 1B, the signals R(x, y), G(x, y), and B(x, y) individually express the colored information of the pixel P(x, y). If each pixel of R, G, and B is expressed in 8 bits, the data amount of each pixel is 3*8=24 bits.

From FIG. 1A and FIG. 1B, when the traditional scanner transmits the image data to the personal computer, all of R, G, and B of each pixel are transmitted. The image data, which will be transmitted, will be saved in a buffer of the digital camera at first. When the buffer is full, the buffer will transmit the data, which are saved in it, to a memory card of the digital camera to be saved. In general, occupied memory space of pixels is very huge. Therefore, if all of the R, G, and B of each pixel are saved in the memory card without compression procedure, the memory card will be often full and this condition will cause troubles for the user. When the amount of image data is greater, the memory card full conditions are more and the using time of the memory card is shorter. The lifetime of the memory card is also decreased. The memory card, whose all space is saved data, of the digital camera can be replaced by a new memory card to increase saving image data of the digital camera following needs of the user. But this condition will increase the cost of the user more easily. Therefore, compressing image data suitably will increase the photo image data of the memory card of the digital camera.

SUMMARY OF THE INVENTION

In accordance with the background of the above-mentioned invention, the traditional saving method will decrease the amount of the image data of the memory card to cause the shorter using time of the image-collecting device because the amount of saving image data is greater. The present invention provides a method to decrease the amount of the photo image data by classifying colors to pre-compress the photo image data.

The second objective of the present invention is to increase the amount of the photo image data saved in the memory card by the method for compressing the photo image data by classifying colors to pre-compress the photo image data.

The third objective of the present invention is to decrease full conditions of the memory card by classifying colors to pre-compress the photo image data.

The further objective of the present invention is to increase the lifetime of the memory card by classifying colors to pre-compress the photo image data.

In according to the foregoing objectives, the present invention provides a method to decrease the amount of the photo image data by classifying colors to pre-compress the photo image data. At first, input image data are transformed from a RGB coordinate to a Lab coordinate in the present invention. Then each pixel of the image from a beginning to an end of the first row data is processed. After finishing to process the first row data, the present invention will start to process the next row data in turn until all data of all rows of the image are processed completely. At first, the first L value, the first a value, and the first b value of the first pixel of the first row are saved in a memory to become the first data. Then the first difference between the first data and the second pixel, which comprises the second L value, the second a value, and the second b value, is calculated. When the first difference is lower than the first set value, the second pixel is classified as same sort as the first pixel. When the first difference is not lower than the first set value, the second pixel is saved in the memory to become the second data. When a pixel, whose location is the mth row and the nth (column), is calculated, the plural kth differences between the nth pixel, which comprises the nth L value, the nth a value, and the nth b value, and the plural data, which are saved in the memory, are calculated and the minimum kth difference is got from the plural kth differences. When the minimum kth difference is lower than the first set value, the nth pixel is classified as same sort as a pixel which is corresponding to the minimum kth difference. When the minimum kth difference is not lower than the first set value, the plural pth differences between the mth row and the nth (column) pixel and the (m−1)th row and the nth (column) pixel, the mth row and the nth (column) pixel and the mth row and the (n−1)th (column) pixel, and the mth row and the nth (column) pixel and the (m−1)th row and the (n−1)th (column) pixel are calculated and the minimum pth difference is got from the plural pth differences. When the minimum pth difference is lower than the second set value, the nth pixel is classified as same sort as a pixel which is corresponding to the minimum pth difference. When the minimum pth difference is not lower than the second set value, the nth pixel is saved in the memory to become the qth data. The present invention can also increase the amount of the photo image data saved in the memory card. The present invention can further increase the lifetime of the memory card.

BRIEF DESCRIPTION OF THE DRAWINGS

In the accompanying drawing forming a material part of this description, there is shown:

FIG. 1A shows a diagram in how to choose the R, G, and B at a beginning area of a digital image data;

FIG. 1B shows a diagram of R, G, and B, which corresponds to each pixel; and

DESCRIPTION OF THE PREFERRED EMBODIMENT

Figure 2A:
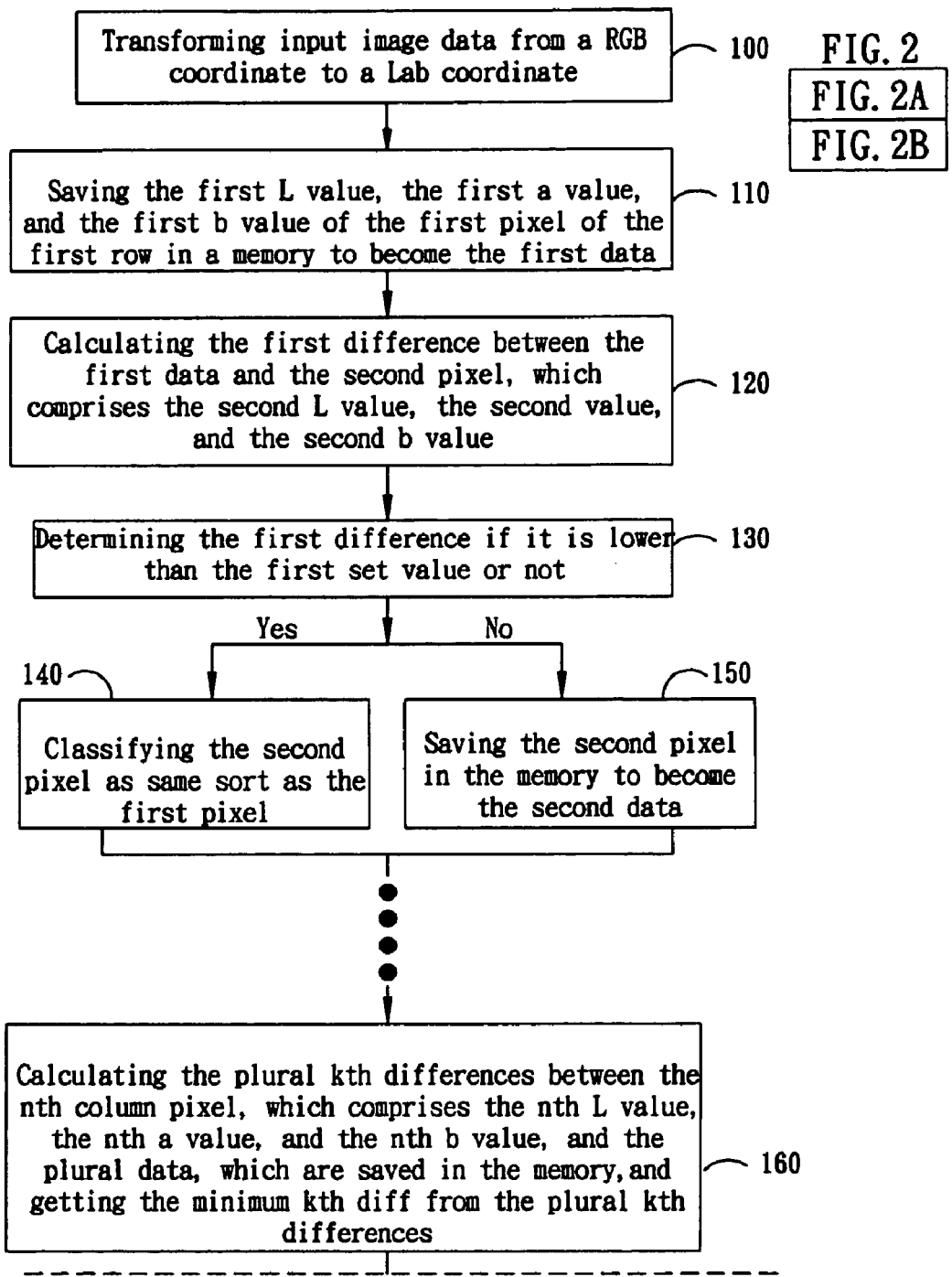
FIG. 2 consisting of FIGS. 2A and 2B a flowchart in compressing image data by classifying colors of the present invention.

The foregoing aspects and many of the intended advantages of this invention will become more readily appreciated as the same becomes better understood by reference to the following detailed description, when taken in conjunction with the accompanying drawings, wherein:

The present invention provides a method to decrease the amount of the photo image data by classifying colors to pre-compress the photo image data. After photo image data are got by using a lens and a charge coupled device (CCD), the photo image data are saved in a memory of the image collecting device to proceed a image process. The present invention can be used in any image collecting device, such as: a digital camera or a digital video camera. The photo image, which is got by using the image collecting device, usually comprises plural pixels, wherein the pixels are arranged in order by using an array mode. In usual, the pixels of the photo image are saved and shown in RGB mode.

At first, the present invention transforms the image data from a RGB coordinate to a Lab coordinate. The Lab coordinate is another kind of three dimensional full color coordinate system by using a color classifying. The character "L" of the Lab coordinate means a lightness of a pixel. The character "a" of the Lab coordinate means a ratio of redness to greenness of the pixel. The character "b" of the Lab coordinate means a ratio of yellowness to blueness of the pixel.

Therefore, each pixel of the photo image will be transformed from an "R" value, a "G" value, and a "B" value to become an "L" value, a "a" value, and a "b" value. The "L" value, the "a" value, and the "b" value of each pixel are to express a location of the pixel in the Lab coordinate. The "L" value, the "a" value, and the "b" value of each pixel also are transformed to become a Lab value by using a formula to be used to express an absolute value of the pixel in the Lab coordinate and to compare with other pixels.

In usual, a plane is composed by plural lines and each photo image is composed by plural lines in a image process, wherein each of plural lines is usually a row data and the row data comprises plural pixels. After each pixel of photo image is transmitted from the RGB coordinate system to the Lab coordinate system, a arrangement mode of pixels of the photo image is still the array mode. Then the present invention will proceed a image process form a beginning pixel to an end pixel of the first row data in turn. After finishing to process the first row data, the present invention will start to process the next row data in turn until all data of all rows of the photo image are processed completely.

When a photo image comprises the first row data and the second row data, wherein the first row data comprises the first pixel, the second pixel, the third pixel and the second row data comprises the fourth pixel, the fifth pixel, the sixth pixel. The first pixel and the fourth pixel are in the same column. The second pixel and the fifth pixel are in the same colunm. The third pixel and the sixth pixel are in the same column. At first, the present invention will determine a memory if there is a datum in it or not. In usual, there is not any datum saved in a color data base region of the memory before proceeding the image process. Therefore, the first pixel, whose coordinate is (0,0) and comprises the first "L" value, the first "a" value, and the first "b" value, is saved in the color data base region of the memory to become the first data. The memory can be a buffer. Then the first difference, which is between the second pixel that comprises the second "L" value, the second "a" value, and the second "b" value and the first data, is calculated and is determined if the first difference is lower than the first set value or not. When the first difference is lower than the first set value, the second pixel is classified as same sort as the first pixel and an index value of the second pixel is saved. When the first difference is not lower than the first set value, the second pixel is saved in the color data base region of the memory to become the second data. Then a difference between the third pixel, which comprises the third "L" value, the third "a" value, and the third "b" value, and data, which are saved in the color data base region of the memory is calculated. When there is only the first data in the color data base region of the memory, the difference is the second difference and the second difference is used to be the minimum second difference. When there are the first data and the second data in the color data base region of the memory, the plural second differences are got and the minimum second difference is collected from the plural second differences. Then the minimum second difference is determined if it is lower than the first set value or not. When the minimum second difference is lower than the first set value, the third pixel is classified as same sort as a pixel, which is corresponding to the minimum second difference and an index value of the third pixel is saved. When the minimum second difference is not lower than the first set value, the third difference between the third pixel and the second pixel is calculated, wherein the second pixel is the same row and the determined column of the third pixel. When the third difference is lower than the second set value, the third pixel is classified as same sort as the second pixel and an index value of the third pixel is saved. When the third difference is not lower than the second set value, the third pixel is saved in the color data base region of the memory to become the second data and the image process of the first row data is finished.

Then the fourth difference between the fourth pixel, which comprises the fourth "L" value, the fourth "a" value, and the fourth "b" value and first data, which are saved in the color data base region of the memory is calculated. When there is only the first data in the color data base region of the memory, the fourth difference is used to be the minimum fourth difference. When there are plural data in the color data base region of the memory, the plural fourth differences are got and the minimum fourth difference is collected from the plural fourth differences. Then the minimum fourth difference is determined if it is lower than the first set value or not. When the minimum fourth difference is lower than the first set value, the fourth pixel is classified as same sort as a pixel, which is corresponding to the minimum fourth difference and an index value of the fourth pixel is saved. When the minimum fourth difference is not lower than the first set value, the fourth pixel is saved in the color data base region of the memory to become the fourth data. In usual, the first pixel is saved in the color data base region of the memory to become the first data directly, therefore a difference between the fourth pixel and the first pixel is not calculated again.

Then the fifth difference between the fifth pixel, which comprises the fifth "L" value, the fifth "a" value, and the fifth "b" value, and data, which are saved in the color data base region of the memory is calculated. When there is only the first data in the color data base region of the memory, the fifth difference is the minimum fifth difference. When there are plural data in the color data base region of the memory, the plural fifth differences are got and the minimum fifth difference is collected from the plural fifth differences. Then the minimum fifth difference is determined if it is lower than the first set value or not. When the minimum fifth difference is lower than the first set value, the fifth pixel is classified as same sort as a pixel, which is corresponding to the minimum fifth difference and an index value of the fifth pixel is saved. When the minimum fifth difference is not lower than the first set value, the plural sixth differences between the fifth pixel and the fourth pixel, whose location is the same row and the preceding column of the fifth pixel, the fifth pixel and the second pixel, whose location is the same column and the preceding row of the fifth pixel, and the fifth pixel and the first pixel, whose location is the same row and the preceding column of the second pixel are calculated, wherein the location of the first pixel is the preceding row and the preceding column of the fifth pixel. Then the plural sixth difference are compared and the minimum sixth difference is collected to determine if the minimum sixth difference is lower than the second set value or not. When the minimum sixth difference is lower than the second set value, the fifth pixel is classified as same sort as a pixel, which is corresponding to the minimum sixth difference and an index value of the fifth pixel is saved. When the minimum sixth difference is not lower than the second set value, the fifth pixel is saved in the color data base region of the memory to become the fifth data.

Then the seventh difference between the sixth pixel, which comprises the sixth "L" value, the sixth "a" value, and the sixth "b" value, and data, which are saved in the color data base region of the memory is calculated. When there is only the first data in the color data base region of the memory, the seventh difference is the minimum seventh difference. When there are plural data in the color data base region of the memory, the plural seventh differences are got and the minimum seventh difference is collected from the plural seventh differences. Then the minimum seventh difference is determined if it is lower than the first set value or not. When the minimum seventh difference is lower than the first set value, the sixth pixel is classified as same sort as a pixel, which is corresponding to the minimum seventh difference and an index value of the sixth pixel is saved. When the minimum seventh difference is not lower than the first set value, the plural eighth differences between the sixth pixel and the fifth pixel, whose location is the same row and the preceding column of the sixth pixel, the sixth pixel and the third pixel, whose location is the same column and the preceding row of the sixth pixel, and the sixth pixel and the second pixel, whose location is the same row and the preceding column of the third pixel are calculated, wherein the location of the second pixel is the preceding row and the preceding column of the sixth pixel. Then the plural eighth difference are compared and the minimum eighth difference is collected to determine if the minimum eighth difference is lower than the second set value or not. When the minimum eighth difference is lower than the second set value, the sixth pixel is classified as same sort as a pixel, which is corresponding to the minimum eighth difference and an index value of the sixth pixel is saved. When the minimum eighth difference is not lower than the second set value, the sixth pixel is saved in the color data base region of the memory to become the sixth data and the image compressing process of the present invention is finished. After passing through the image process of the present invention, there are only data, which is saved in the color data base region, and amounts and locations of the data can be saved in the memory. The present invention can increase a capacity of the memory, which is used to save the photo image data.

When the photo image comprises plural lines and each lines comprises plural pixels, the method of the present invention will transmit the RGB coordinate to become the Lab coordinate of each pixel of the photo image at first. Then the method of the present invention will start to determine a memory if there is a datum in it or not and will proceed an image compressing process to the first pixel, whose location is in the first row and the first column, in turn. When the method of the present invention is used to compress a pixel, whose location is the mth row and the nth column, wherein m and n are natural numbers, the plural kth difference between the mth row and the nth column pixel, which comprises the nth L value, the nth a value, and the nth b value, and the plural data, which are saved in the memory, are calculated and the minimum kth difference is got from the plural kth differences. When the minimum kth difference is lower than the first set value, the nth pixel is classified as same sort as a pixel which is corresponding to the minimum kth difference. When the minimum kth difference is not lower than the first set value, the plural pth differences between the mth row and the nth column pixel and the (m−1)th row and the nth column pixel, the mth row and the nth column pixel and the mth row and the (n−1)th column pixel, and the mth row and the nth column pixel and the (m−1)th row and the (n−1)th column pixel are calculated and the minimum pth difference is got from the plural pth differences. When the minimum pth difference is lower than the second set value, the nth pixel is classified as same sort as a pixel which is corresponding to the minimum pth difference. When the minimum pth difference is not lower than the second set value, the nth pixel is saved in the memory to become the qth data. The characters "k", "p", and "q" are natural numbers.

Figure 2B:
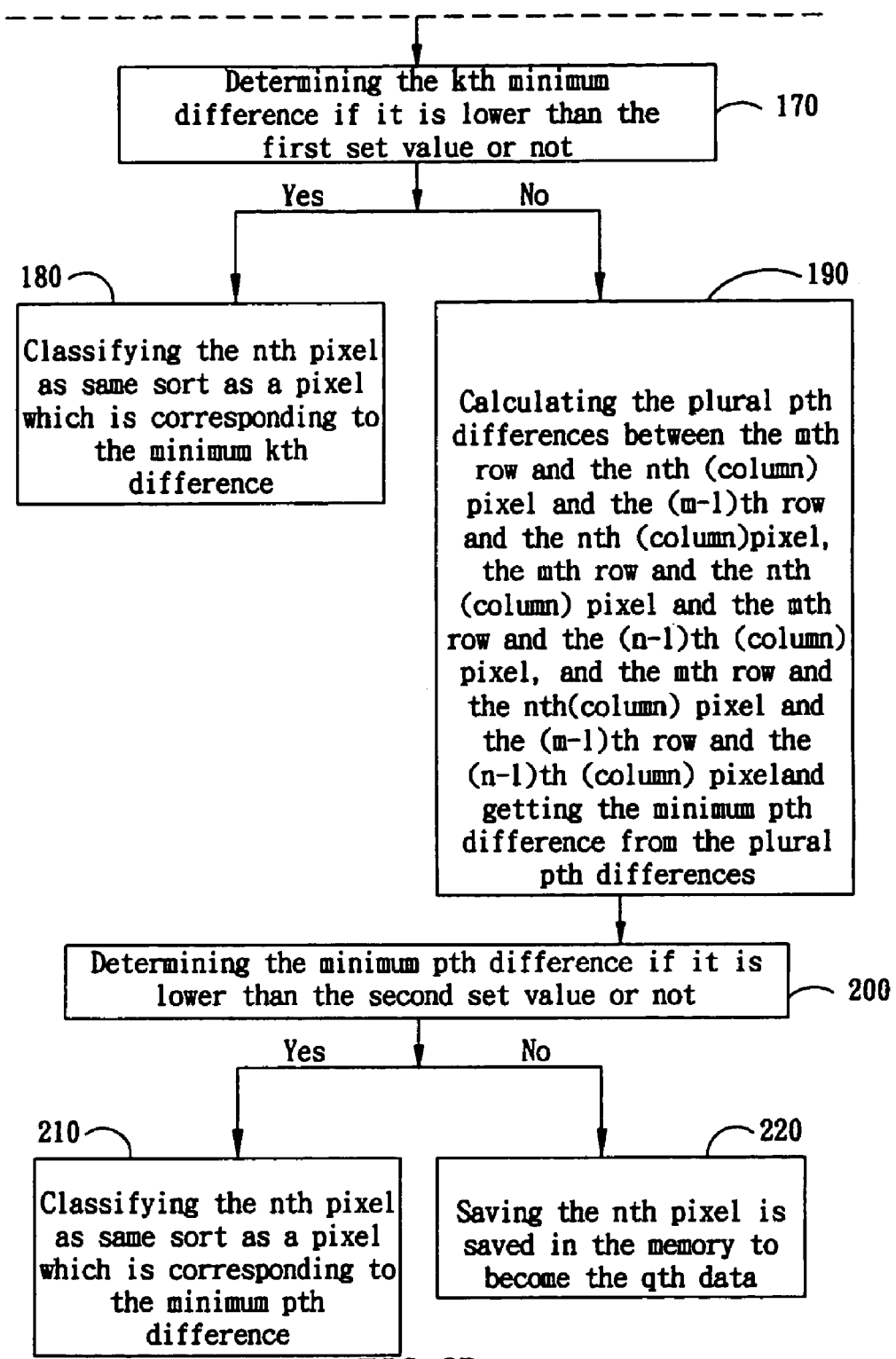

Referring to FIG. 2, this shows a flowchart in compressing image data by classifying colors of the present invention. At first, input image data are transformed from a RGB coordinate to a Lab coordinate in the present invention 100. Then each pixel of the image from a beginning to an end of the first row data is processed. After finishing to process the first row data, the present invention will start to process the next row data in turn until all data of all rows of the image are processed completely. At first, the first L value, the first a value, and the first b value of the first pixel of the first row are saved in a memory to become the first data 110. Then the first difference between the first data and the second pixel, which comprises the second L value, the second a value, and the second b value, is calculated 120 and is determined if the first difference is lower than the first set value or not 130. When the first difference is lower than the first set value, the second pixel is classified as same sort as the first pixel 140. When the first difference is not lower than the first set value, the second pixel is saved in the memory to become the second data 150. When a pixel, whose location is the mth row and the nth (column), is calculated, the plural kth differences between the nth pixel, which comprises the nth L value, the nth a value, and the nth b value, and the plural data, which are saved in the memory, are calculated and the minimum kth difference is got from the plural kth differences 160. Then the kth minimum difference is determined if it is lower than the first set value or not 170. When the minimum kth difference is lower than the first set value, the nth pixel is classified as same sort as a pixel which is corresponding to the minimum kth difference 180. When the minimum kth difference is not lower than the first set value, the plural pth differences between the mth row and the nth (column) pixel and the (m−1)th row and the nth (column) pixel, the mth row and the nth (column) pixel and the mth row and the (n−1)th (column) pixel, and the mth row and the nth (column) pixel and the (m−1)th row and the (n−1)th (column) pixel are calculated and the minimum pth difference is got from the plural pth differences 190. Then the minimum pth difference is determined if it is lower than the second set value or not 200. When the minimum pth difference is lower than the second set value, the nth pixel is classified as same sort as a pixel which is corresponding to the minimum pth difference 210. When the minimum pth difference is not lower than the second set value, the nth pixel is saved in the memory to become the qth data 220.

In accordance with the present invention, the present invention provides a method to decrease the amount of the photo image data by classifying colors to pre-compress the photo image data. At first, input image data are transformed from a RGB coordinate to a Lab coordinate in the present invention. Then each pixel of the image from a beginning to an end of the first row data is processed. After finishing to process the first row data, the present invention will start to process the next row data in turn until all data of all rows of the image are processed completely. At first, the first L value, the first a value, and the first b value of the first pixel of the first row are saved in a memory to become the first data. Then the first difference between the first data and the second pixel, which comprises the second L value, the second a value, and the second b value, is calculated. When the first difference is lower than the first set value, the second pixel is classified as same sort as the first pixel. When the first difference is not lower than the first set value, the second pixel is saved in the memory to become the second data. When a pixel, whose location is the mth row and the nth (column), is calculated, the plural kth differences between the nth pixel, which comprises the nth L value, the nth a value, and the nth b value, and the plural data, which are saved in the memory, are calculated and the minimum kth difference is got from the plural kth differences. When the minimum kth difference is lower than the first set value, the nth pixel is classified as same sort as a pixel which is corresponding to the minimum kth difference. When the minimum kth difference is not lower than the first set value, the plural pth differences between the mth row and the nth (column) pixel and the (m−1)th row and the nth (column) pixel, the mth row and the nth (column) pixel and the mth row and the (n−1)th (column) pixel, and the mth row and the nth (column) pixel and the (m−1)th row and the (n−1)th (column) pixel are calculated and the minimum pth difference is got from the plural pth differences. When the minimum pth difference is lower than the second set value, the nth pixel is classified as same sort as a pixel which is corresponding to the minimum pth difference. When the minimum pth difference is not lower than the second set value, the nth pixel is saved in the memory to become the qth data. The present invention can also increase the amount of the photo image data saved in the memory card. The present invention can further increase the lifetime of the memory card.

Although specific embodiments have been illustrated and described, it will be obvious to those skilled in the art that various modifications may be made without departing from what is intended to be limited solely by the appended claims.

What is claimed is:

1. A method for compressing an image by classifying colors, wherein said method comprises:
    collecting a photo image, said photo image comprising plural data, such as: a first row data, a second row data, and a third row data, . . . , and a mth row data, wherein each of said plural row data comprises plural pixels, such as: a first pixel, a second pixel, a third pixel, . . . , and a nth pixel, and said plural pixels are showed in a RGB coordinate;
    transforming said plural pixels from said RGB coordinate to become a Lab coordinate;
    processing said plural row data in turn in a row data compressing process, wherein said row data compressing process comprises:
        proceeding said plural pixels in turn in a pixel compressing process, wherein said pixel comprising process comprises:
            determining a memory if there are datum in said memory or not;
            saving any of said plural pixels in said memory to become a first data when there is no said datum in said memory;
            calculating a first difference between said any of said plural pixels and said first data when said first data are in said memory, wherein said first difference is a minimum first difference when said first data are an only one pixel value;
            collecting said minimum first difference from said plural first differences;

classifying said any pixel as same sort as a pixel which is corresponding to said minimum first difference and saving an index value of said any pixel when said minimum first difference is lower than said first set value;

calculating plural second difference between said any pixel and a pixel whose location is the same row and the preceding column of said any pixel, said any pixel and a pixel whose location is the same column and the preceding row of said any pixel, and said any pixel and the preceding row and the preceding column of said any pixel when said minimum first difference is not lower than said first set value, wherein a minimum second difference is got from said plural second difference;

comparing said minimum second difference and a second set value;

classifying said any pixel as same sort as a pixel which is corresponding to said minimum second difference and saving the index value of said any pixel when said minimum second difference is lower than said second set value;

saving said any pixel in said memory to become said first data when said minimum second difference is not lower than said second set value;

saving said plural pixels in said memory; and saving said plural pixel in said memory.

2. The method according to claim 1, wherein said memory is a buffer.

3. The method according to claim 1, wherein said memory comprises a color data base region.

4. The method according to claim 1, wherein said m is a natural number.

5. The method according to claim 1, wherein said n is a natural number.

6. A method for compressing an image by classifying colors, wherein said method comprises:

collecting a photo image, said photo image comprising a first row data and a second row data, wherein said first row data comprises a first pixel, a second pixel, and a third pixel and said second row data comprises a fourth pixel, a fifth pixel, and a sixth pixel;

transforming said first pixel, said second pixel, said third pixel, said fourth pixel, said fifth pixel, and said sixth pixel from a RGB coordinate to become a Lab coordinate;

saving a first Lab value of said first pixel in a memory to become a first data;

calculating a first difference between a second Lab value of said second pixel and said first data and comparing said first difference and a first set value;

classifying said second pixel as same sort as said first pixel and saving an index value of said second pixel when said first difference is lower than said first set value;

saving said second Lab value of said second pixel in said memory to become a second data when said first difference is not lower than said first set value;

calculating a plural second differences between a third Lab value of said third pixel and said second data and collecting a minimum second difference from said plural second differences;

comparing said minimum second difference and said first set value;

classifying said third pixel as same sort as said second pixel and saving an index value of said third pixel when said minimum second difference is lower than said first set value;

saving said third Lab value of said third pixel in said memory to become said third data when said minimum second difference is not lower than said first set value;

calculating plural third differences between a fourth Lab value of said fourth pixel and said data and collecting a minimum third difference from said plural third differences;

comparing said minimum third difference and said first set value;

classifying said fourth pixel as same sort as said a pixel which is corresponding to said minimum third difference and saving an index value of said fourth pixel when said minimum third difference is lower than said first set value;

saving said fourth Lab value of said fourth pixel in said memory to become a fourth data when said minimum third difference is not lower than said first set value;

calculating plural fourth differences between a fifth Lab value of said fifth pixel and said data and collecting a minimum fourth difference from said plural fourth differences;

comparing said minimum fourth difference and said first set value;

classifying said fifth pixel as same sort as said a pixel which is corresponding to said minimum fourth difference and saving the index value of said fifth pixel when said minimum fourth difference is lower than said first set value;

calculating plural fifth differences between said fifth pixel and said fourth pixel, said fifth pixel and said second pixel, and said fifth pixel and said first pixel and collecting a minimum fifth difference form said plural fifth differences, wherein said fourth pixel is the same row and the preceding column of said fifth pixel, said second pixel is the same column and the preceding row of said fifth pixel, and said first pixel is the same row and the preceding column of said second pixel when said minimum fourth difference is not lower than said first set value;

comparing said minimum fifth difference and a second set value;

classifying said fifth pixel as same sort as said a pixel which is corresponding to said minimum fifth difference and saving an index value of said fifth pixel when said minimum fifth difference is lower than said second set value;

saving said fifth Lab value of said fifth pixel in said memory to become a fifth data when said minimum fifth difference is not lower than said second set value;

calculating plural sixth differences between a sixth Lab value of said sixth pixel and said data and collecting a minimum sixth difference from said plural sixth differences;

comparing said minimum sixth difference and a first set value;

classifying said sixth pixel as same sort as said a pixel which is corresponding to said minimum sixth difference and saving the index value of said sixth pixel when said minimum sixth difference is lower than said first set value;

calculating plural seventh differences between said sixth pixel and said fifth pixel, said sixth pixel and said third pixel, and said sixth pixel and said second pixel and collecting a minimum seventh difference form said plural seventh differences, wherein said fifth pixel is the same row and the preceding column of said sixth pixel, said third pixel is the same column and the preceding row of said sixth pixel, and said second pixel is the same row and the preceding column of said third pixel when said minimum sixth difference is not lower than said first set value;

comparing said minimum seventh difference and a second set value;

classifying a seventh pixel as same sort as said a pixel which is corresponding to said minimum seventh difference and saving the index value of said sixth pixel when said minimum seventh difference is lower than said second set value; and saving said sixth Lab value of said sixth pixel in said memory to become a sixth data when said minimum seventh difference is not lower than said second set value.

7. The method according to claim 6, wherein said row data comprises plural pixel values.

8. The method according to claim 6, wherein said memory is a buffer.

9. The method according to claim 6, wherein said memory comprises a color data base region.

\* \* \* \* \*